US010642285B2

(12) United States Patent
Artemiadis et al.

(10) Patent No.: US 10,642,285 B2
(45) Date of Patent: May 5, 2020

(54) SYSTEMS AND METHODS FOR DYNAMICS, MODELING, SIMULATION AND CONTROL OF MID-FLIGHT COUPLING OF QUADROTORS (71) Applicant: ARIZONA BOARD OF REGENTS ON BEHALF OF ARIZONA STATE UNIVERSITY, Tempe, AZ (US)

(72) Inventors: Panagiotis Artemiadis, Tempe, AZ (US); Daniel Larsson, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 147 days.

(21) Appl. No.: 15/715,506

(22) Filed: Sep. 26, 2017

(65) Prior Publication Data
US 2018/0164835 A1 Jun. 14, 2018

Related U.S. Application Data (60) Provisional application No. 62/400,475, filed on Sep. 27, 2016.

(51) Int. Cl.
*G05D 1/10* (2006.01)
*G05D 1/08* (2006.01)
*B64C 39/02* (2006.01)

(52) U.S. Cl.
CPC ............ *G05D 1/104* (2013.01); *G05D 1/08* (2013.01); *G05D 1/0858* (2013.01); *G05D 1/10* (2013.01);
(Continued)

(58) Field of Classification Search
None
See application file for complete search history.

(56) References Cited

U.S. PATENT DOCUMENTS 9,146,557 B1 * 9/2015 Ahmed ................ G05D 1/0858
9,833,895 B2 12/2017 Artemiadis
(Continued)

FOREIGN PATENT DOCUMENTS

WO 2014070672 A1 5/2014

OTHER PUBLICATIONS

Zhang et al., "On New UAW Flight Control System Based on Kalman & PID", 2nd International Conference on Intelligent Control and Information Processing, Jul. 25-28, 2011 (Year: 2011).*
(Continued)

*Primary Examiner* — Tamara L Weber
(74) *Attorney, Agent, or Firm* — Polsinelli PC (57) ABSTRACT A first rotorcraft is provided, including a plurality of first coupling points. A second rotorcraft is provided, including a plurality of second coupling points. The first rotorcraft is mechanically coupled to the second rotorcraft using the plurality of first coupling points and the plurality of second coupling points to form a coupled configuration. A joint controller is implemented to maneuver the first rotorcraft and the second rotorcraft of the coupled configuration. Gains associated with the joint controller are set dependent on the application and anticipated maneuvers. The gains are scheduled to be moderate at time instances immediately following the formation of the coupled configuration and then the gains are changed to more aggressive values once the coupled configuration has been stabilized.

9 Claims, 8 Drawing Sheets
(7 of 8 Drawing Sheet(s) Filed in Color)

(52) U.S. Cl.
CPC ...... *B64C 39/024* (2013.01); *B64C 2201/027* (2013.01); *B64C 2201/108* (2013.01); *B64C 2201/141* (2013.01)

(56) References Cited

U.S. PATENT DOCUMENTS

| | | | |
|---|---|---|---|
| 2017/0068252 A1* | 3/2017 | Yu | G05D 1/0858 |
| 2017/0253330 A1* | 9/2017 | Saigh | B64C 39/024 |
| 2017/0285664 A1* | 10/2017 | Wang | B64C 39/024 |
| 2017/0297445 A1* | 10/2017 | Zheng | B64C 39/024 |
| 2017/0369169 A1* | 12/2017 | Lee | B64D 5/00 |
| 2018/0081351 A1* | 3/2018 | Tankersley | G05D 1/0011 |

OTHER PUBLICATIONS

Rudol, et al., "Mico unmanned aerial vehicle visual servoing for cooperative indoor exploration", (2008).
Sa, et al., "Estimation and control for an open-source quadcopter", in "Australasian Conference on Robotics and Automation", (2011).
Sa, et al., "System indetification, estimation and control for a cost effective open-source quadcopter", in "IEEE International Conference on Robotics and Automation", (2012).
Schmid, et al., "Stereo vision based indoor/outdoor navigation for flying robots", International Conference on Intelligent Robots and Systems pp. 3955-3962 (2013).
Schmidt, Simulation and Control of a Quadrotor Unmanned Aerial Vehicle, Master's thesis, University of Kentucky (2011).
Simoes, "Optimizing a coaxial propulsion system to a quadcopter", 2000.
Thrun, et al., "A real-time algorithm for mobile robot mapping with applications to multi-robot and 3d mapping", International Conference on Robotics and Automation pp. 321-328 (2000).
Uavision. 2016. [Online] Available: http://www.uavision.com/#?applications/c1tsl.
Young, et al., University Physics, vol. 1 (Pearson Addison-Wesley, 2007b), 12th edition edn.
Young, et al., University Physics, vol. 2 (Pearson Addison-Wesley, 2007a), 12th edition edn.
Achtelik, et al., "Visual tracking and control of a quadcopter using a stereo camera system and inertial sensors", in "IEEE International Conference on Mechatronics and Automation", (2009).
Akoun, et al., "3D analytical calculation of the forces exerted between two cuboidal magnets", IEEE Transactions on Magnetics pp. 1962-1964 (1984).
Ali, et al., "Decision-support tool for designing small package delivery aerial vehicles (dst-spdav)", in "2015 IEEE Systems and Information Engineering Design Symposium", (2015).
Apex Magnets. 2015. [Online] Available: https://www.apexmagnets.com/8mm-x-4mm-disc.
Blosch, et al., "Vision based may navigation in unknown and unstructured envrironments", (2010).
Bloss, "Unmanned vechiles while becoming smaller and smarter are addressing new applications in medical, agriculture, in addition to military and security", Industrial Robot: An International Journal 41, 82-86 (2014).
Brandt, et al., "Propeller performace data at low reynolds numbers", in "AIAA Aerospace Sciences meeting", (American Institute of Aeronautics and Astronautics, inc., 2011).
Chaturdevdi, et al., "Nonlinear dynamics of the 3d pendulum", (2011).
Coleman, et al., "A survey of theoretical and experimental coaxial rotor aerodynamic research", Tech. rep., Ames Research Center (1997).
Etkin, et al., Dynamics of Flight stability and control (John Wiley & Sons, 1996), third edn.
Furlani, "A formula for the leviation force between magnetic disks", IEEE Transactions on Magnetics 29, 6, 4165-4169 (1993).
Hoffmann, et al., "Quadrotor helicopter flight dynamics and control: Theory and experiment", in "AIAA Guidance, Navigations and Control Conference and Exhibit", (2007).
Huang, et al., "Aerodynamics and control of autonomous quadrotor helicopters in aggressive maneuvering", in "IEEE International Conference on Robotics and Automation", (2009).
Lefebvre, et al., "Study of Anti-Drone Drone concept", MAV Research Center Garden Workshop (Toulouse, France, Jul. 1-2, 2014), Jul. 2014, presentation slides, 24 slides.
Leishman, Principles of Helicopter Aerodynamics (Cambridge University Press, 2006), second edn.
Luukkonen, "Modelling and control of quadcopter", (2011).
Mahony, et al., "Multirotor aerial vehicles", IEEE Robotics & Automation Magazine (2012).
Mellinger, et al., "Trajectory generation and control for precise agressive maneuvers with quadrotors", The International Journal of Robotics Research (2012).
Mellinger, Trajectory Generation and Control for Quadrotors, Ph.D. thesis, University of Pennsylvania (2012).
Michael, et al., "Collaborative mapping of an earthquake-damaged building via ground and aerial robots", Field Robotics 29, 832-841 (2012).
Nemati, et al., "Modeling and control of a single axis tilting quadcopter" , in "American Control Conference", (2014).
Ostojic, et al., "Design, control and application of quadcopter", (2015).

* cited by examiner

SYSTEMS AND METHODS FOR DYNAMICS, MODELING, SIMULATION AND CONTROL OF MID-FLIGHT COUPLING OF QUADROTORS

CROSS REFERENCE TO RELATED APPLICATIONS

This is a non-provisional application that claims benefit to U.S. Provisional Application Ser. No. 62/400,475 filed on Sep. 27, 2017, which is herein incorporated by reference in its entirety.

FIELD

The present disclosure generally relates to quadrotors and in particular to dynamics, modeling, simulation and control of mid-flight coupling of quadrotors.

BACKGROUND

In recent years, quadrotors have received greater attention due to their versatility in both academic research and commercial applications. In numerous places around the world, these maneuverable air vehicles are being used in commercial roles ranging from structural maintenance to private sector surveillance, such as agricultural data collection. Additionally, quadrotors are frequently utilized by military and government organizations. Examples of these are search and rescue, crowd control, domestic security as well as assisting in various military operations.

Considering their popularity, different research has been conducted in modeling the dynamics and control of the quadrotors. The scope and application of the research recently completed is somewhat diverse. In some publications, authors focus attention on the dynamical details of the quadrotor in all aspects of flight; from the hover state and motor modeling to aerodynamic blade flapping. In other publications, the concentration is based on aggressive maneuvering, trajectory generation and controller design for multiple stages or phases of flight. This information has been further synthesized and advanced in a number of ways. In the concept of trajectory generation, quadrotor control is applied in various stages of flight to both the single air vehicle case, as well as team or swarm applications. In these applications, multiple quadrotors may be implemented and controlled and various types of controllers may be tuned in order to provide desirable system response characteristics throughout the flight envelope and intended purpose.

Various applications involving swarm control of quadrotors to accomplish collaborative tasks are known; however, there has been limited or no attempt to study the physical coupling of two discrete quadrotor agents.

It is with these observations in mind, among others, that various aspects of the present disclosure were conceived and developed.

SUMMARY

One implementation of the present disclosure relates to a system, comprising a first controller implemented by a processor; a first rotorcraft in operative communication with the first controller, the first rotorcraft including a plurality of first coupling points; a second rotorcraft, the second rotorcraft comprising a plurality of second coupling points, the second coupling points configured to temporarily engage with the first coupling points; and a joint controller implemented by the processor for navigating the first rotorcraft and the second rotorcraft; wherein the first rotorcraft is operable to assume a coupled configuration with the second rotorcraft by utilizing the first controller to modify an altitude and coordinates associated with yaw, pitch and roll angles of the first quadrotor relative to the second rotorcraft and adjoin the first coupling points with the second coupling points; and wherein in the coupled configuration, gains of the joint controller are scheduled such that the gains are set to a first setting immediately following the assumption of the coupled configuration and the gains are subsequently modified to a second setting.

Another implementation of the present disclosure relates to a method comprising the steps of providing a first rotorcraft, the first rotorcraft including a plurality of first coupling points and a first controller for navigating the first rotorcraft; providing a second rotorcraft, the second rotorcraft including a plurality of second coupling points; navigating the first rotorcraft over the second rotorcraft such that the plurality of first coupling points align with the plurality of second coupling points; mechanically coupling the first rotorcraft to the second rotorcraft to form a coupled configuration by engaging the plurality of first coupling points with the plurality of second coupling points; providing a joint controller for navigating the coupled configuration including the first rotorcraft and the second rotorcraft; and tuning gain values associated with the joint controller to accommodate for the coupled configuration.

Another implementation of the present disclosure relates to an apparatus comprising a first rotorcraft, the first rotorcraft including a motor and a coupling mechanism for mechanically with a second rotorcraft; and a processor in operative communication with the first rotorcraft, the processor implementing a plurality of controllers, each of the plurality of controllers operative to command a rotational frequency of the motor of the first rotorcraft, the plurality of controllers including a joint controller with gains associated with the joint controller being variable to accommodate coupling of the first rotorcraft to the second rotorcraft.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

The present disclosure provides for a novel approach for modeling the coupling dynamics and control of two quadrotors. This novel approach addresses a host of new issues related to coupling the mechanics and influences of one quadrotor on the other quadrotor during flight as well as controller gain tuning to produce desired system response characteristics. The present disclosure provides a systematic way of mathematically modeling impact forces, provides quadrotor equations of motion in both the single and coupled states, and discusses other complications that may be important to consider in practical implementation. A magnet-based way of mechanically coupling the quadrotors is disclosed. In addition, a simulation has been built to model the dynamics of coupled flight in various situations including: (1) stationary coupling, (2) intercept coupling with no target maneuver and (3) intercept coupling with target maneuvering. Finally, simulation results are presented together with a discussion regarding controller gain tuning and feasibility of implementation.

The idea of operatively coupled quadrotors presents a new path for many current applications to be extended. It also opens up new avenues that previously have not been considered, such as the pursuit and capture of enemy quadrotors. Also, this idea may extend and improve team lift operations allowing both vehicles to lift a single standard object at the center of gravity, simultaneously improving the inherent stability of the system—a concept that may become more important as the quadrotor begins to be considered as a package delivery platform.

II. Modeling and System Dynamics

A. Single Quadrotor Model

The popularity of the quadrotor has made the single system dynamics and control a relatively well studied field. Although the dynamics of the quadrotor may be relatively well studied in isolation, a few important distinctions for the case of a coupled system between two quadrotors are vital for a comprehensive understanding of the entire simulation process.

Figure 1:
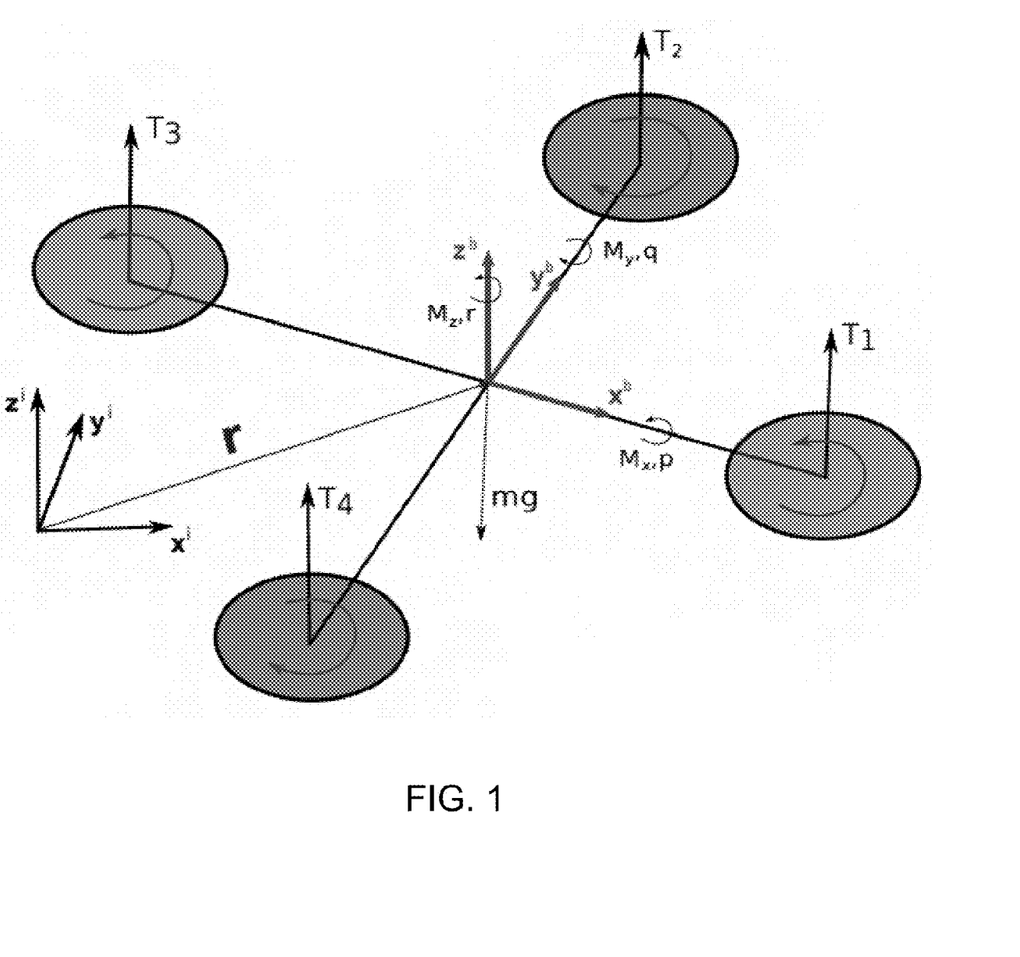
FIG. 1 is a free body diagram for a single quadrotor.

Considering the special orthogonal group in three space SO(3), a quadrotor has a total of six degrees of freedom. These are the x, y, z linear forces/accelerations as well as the moments about each of these three axes. To begin, the free body diagram shown in FIG. 1 is considered. When considering the forces acting upon a body in a three-dimensional space, it is often easier to express the forces in the body-fixed frame of reference. A vector in this body-fixed frame of reference will be denoted by $[x, y, z]^b$ while quantities expressed in the inertial frame will be displayed as $[x, y, z]^i$. All quantities written in the body frame must be related to the inertial system in order to write the equations of motion from Newton's second law. In order to do this, a rotation matrix is constructed utilizing the roll-pitch-yaw Euler angles. Using this set of rotations, the body frame is first yawed about the original z-axis. The resulting intermediate system is then pitched about its y-axis and finally the second intermediate system is rolled about its x-axis. Assuming that the inertial and body frames were originally aligned, this set of three consecutive rotations will construct a transformation from the inertial to body frame and vice versa. The resulting rotation matrix is shown below. Note that this representation uses the shorthand notation $\cos(x) = c_x$ and $\sin(x) = s_x$:

$$R_b^i = \begin{bmatrix} c_\theta c_\psi & s_\phi s_\theta c_\psi - c_\phi s_\psi & c_\phi s_\theta c_\psi + s_\phi s_\psi \\ c_\theta s_\psi & s_\phi s_\theta s_\psi + c_\phi c_\psi & c_\phi s_\theta s_\psi - s_\phi c_\psi \\ -s_\theta & s_\phi c_\theta & c_\phi c_\theta \end{bmatrix} \quad (1)$$

With the above rotation matrix, it becomes possible to express quantities originally in the body frame in the inertial reference system. Therefore, the translational equations of motion become:

$$m \begin{bmatrix} \ddot{x} \\ \ddot{y} \\ \ddot{z} \end{bmatrix}^i = \begin{bmatrix} 0 \\ 0 \\ -mg \end{bmatrix}^i + R_b^i \begin{bmatrix} 0 \\ 0 \\ \sum_{n=1}^{4} T_n \end{bmatrix}^b \quad (2)$$

Here, m represents the mass of the quadrotor, $T_n$, is the thrust of motor n, g is the gravitational acceleration and $[\ddot{x}, \ddot{y}, \ddot{z}]^T$ are the inertial x, y and z accelerations. Equation (2) provides a set of three non-linear state equations that, when solved, will give inertial position and velocity. While this information is essential to the position control of any air vehicle, it does not form a compete set for controlling a quadrotor. In order to form this complete set, the rotation dynamics arising due to the applied torques on the vehicle must be considered. Once again reviewing the free body diagram in FIG. 1, it is found that the applied moments for the single quadrotor case must follow the equation below:

$$M = \begin{bmatrix} M_x \\ M_y \\ M_z \end{bmatrix}^b = \begin{bmatrix} l(T_2 - T_4) \\ l(T_3 - T_1) \\ \tau_2 + \tau_4 - \tau_1 - \tau_3 \end{bmatrix}^b \quad (3)$$

In the above equation $[M_x, M_y, M_z]^T$ are the applied moments along the body x, y, z axes, l is the distance from the center of gravity to the center of rotation of any motor and $T_n$ is the thrust of motor n. Also, in this representation, $\tau_n$ represents the equal and opposite moment applied to the quadrotor due to the torque applied to the propeller shaft. This torque is dependent on the rotational direction of the shaft and is here shown to be consistent with that shown in the free body diagram in FIG. 1.

While the expression for the applied moments has been found, one must also note that this result is written in the body frame reference system. If Newton's second law were to be directly applied to this relation, an incorrect result would be obtained. Instead, the time rate of change of angular momentum must be considered as well as accounting for the non-inertial coordinate frame appropriately. Assuming that the coordinate system shown in the free body diagram is approximately the principle axes, the angular momentum can be written as $$H = I^b \omega^b \quad (4)$$

Above, H is the angular momentum vector, $I^b$ is the moment of inertia tensor and $w^b$ is the rotational rate of the quadrotor with all quantities expressed in the body frame. Taking the time derivative of this expression and considering that the body frame components of angular rates will be denoted p, q, r for roll, pitch yaw, respectively, the attitude, or rotational, dynamics of the system is obtained. This set of equations can be rearranged to yield another collection of three nonlinear state equations.

$$I^b \begin{bmatrix} \dot{p} \\ \dot{q} \\ \dot{r} \end{bmatrix}^b + \begin{bmatrix} p \\ q \\ r \end{bmatrix}^b \times I^b \begin{bmatrix} p \\ q \\ r \end{bmatrix}^b = M \quad (5)$$

Completing the dynamics of a quadrotor will be the equations governing the rate of change of the Euler angles. This must be considered as any rotational action in the body frame will result in a change in quadrotor attitude and therefore its Euler angles. When deriving the expression relating the body reference angular rates to that of the Euler angles, the order of rotation and the respective angular velocity of each axis must be considered. Doing this for the order of rotation discussed here, the following is obtained:

$$\begin{bmatrix} p \\ q \\ r \end{bmatrix} = \begin{bmatrix} 1 & 0 & -s_\theta \\ 0 & c_\phi & s_\phi c_\theta \\ 0 & -s_\phi & c_\phi c_\theta \end{bmatrix} \begin{bmatrix} \dot{\phi} \\ \dot{\theta} \\ \dot{\psi} \end{bmatrix} \quad (6)$$

The above differential equations, construct a system of twelve non-linear, coupled, first order state equations that can then be solved given initial conditions. These state equations are solved using the MATLAB built-in ordinary differential equations solver ode45. The input to the quadrotor is modeled as the rotational frequency of each motor, thereby constructing a multiple-input-multiple-output (MIMO) system. The rotational frequency of each motor is commanded by a proportional integral derivative (PID) controller, using feedback of the current orientation (attitude), position and velocity of the vehicle. These considerations are discussed in a later section.

B. Dual Quadrotor Coupling Modeling

The coupled quadrotor case presents a variety of added issues that must be considered in order to properly model and apply the dynamics in simulation. Some of the questions that must be answered are:

1) How is the connection to be done?
2) How will having an additional quadrotor attached to the first influence the dynamics of the system?
3) Are there any additional complications that may arise due to a specific design or configuration?

Many of these questions are answered below by modifying the already presented equations of motion to depict the change in dynamics.

The equations of motion that are to be presented here make the following assumptions:

1) The location of the added quadrotor is known (by design) to the first vehicle (see FIG. 2).
2) The geometry of both quadrotors is known.
3) The system behaves as a rigid body after coupling.
4) The connection between the two vehicles is instantaneous.
5) The yaw angle is controllable on at least one vehicle.

The assumption of an instantaneous connection is applied only to the moment of switched dynamics. That is, the time instance in which two quadrotors exist as separately controllable bodies to that when they behave as a single rigid body is assumed to be instantaneous. The modeling of the connection forces and disturbances is discussed at a later section.

Figure 2:
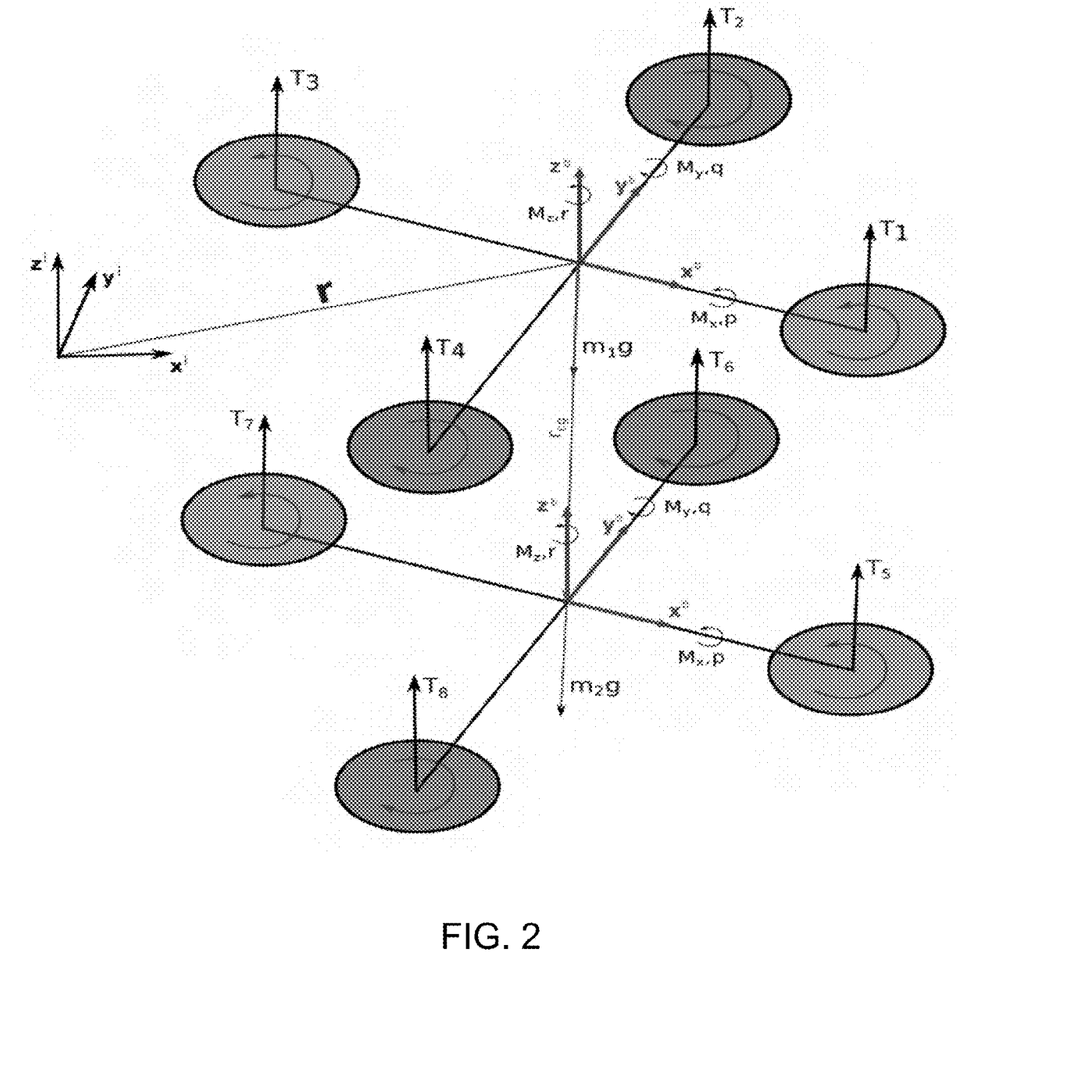
FIG. 2 is a free body diagram for the coupled quadrotor system.

Considering the free body diagram for the coupled system (FIG. 2), the equations of motion for the translational dynamics may be written as:

$$m_T \begin{bmatrix} \ddot{x} \\ \ddot{y} \\ \ddot{z} \end{bmatrix}^i = \begin{bmatrix} 0 \\ 0 \\ -m_T g \end{bmatrix}^i + R_b^i \begin{bmatrix} 0 \\ 0 \\ \sum_{n=1}^{b} T_n \end{bmatrix}^b \quad (7)$$

where $m_T = m_1 + m_2$ is used to represent the total mass of the system. Equation (7) also assumes that control over the second quadrotor is possible after the connection is performed. If this is not the case, the summation term in equation. (7) would remain the same as that in equation (2). However, the content presented in this disclosure assumes that the system transforms from a four to an eight input system at the time of impact.

The more difficult challenge lies in modeling the rotational motion of the quadrotor. Namely, the second quadrotor's weight will cause a moment on the first in three-dimensional space as shown in FIG. 2. This moment must be appropriately modeled in order for an accurate depiction of reality in simulation to be accomplished. To model this force and resulting moment, the weight vector of the second mass always points downward in the inertial frame. Furthermore, the moment that this added mass applies to the first is highly dependent on (1) the location of the second mass relative to the first, and (2) the orientation of the vehicle in space. In addition, one must consider that the rotational dynamics equation derived for the single quadrotor case is valid in the body frame, since the appropriate actions have been taken to compensate for this non-inertial frame of reference. As such, it is suggested that the moment on the first mass due to the second be modeled as:

$$M_2 = r_{eg}^b \times F_{eg}^b \quad (8)$$

where $r_{eg}^b$ is a vector, expressed in the body frame of quadrotor one, defining the location of the center of gravity of quadrotor two relative to that of one. Using this numbering method, it is assumed that the chase, or upper, quadrotor is referred to as quadrotor one, with the lower then being quadrotor two. With this in mind, $r_{eg}^b$ is defined by the following equation:

$$F_{eg}^b = (R_b^i)^T \begin{bmatrix} 0 \\ 0 \\ -m_2 g \end{bmatrix}^i \quad (9)$$

In simulation, this calculation was simplified through the use of skew-symmetric matrix operations. Any vector with components $[v_x, v_y, v_z]^T$ has a skew-symmetric representation as follows:

$$[V \times] = \begin{bmatrix} 0 & -v_z & v_y \\ v_x & 0 & -v_x \\ -v_y & v_x & 0 \end{bmatrix} \quad (10)$$

It is now possible to consolidate the cross product in equation (8) with the expression in (8) to a single mathematical relation that will both account for the attitude of the vehicle and the location of the second mass, thereby making this model practical for general applications. This is done as follows:

$$M_2 = [r_{cg}^b \times](R_b^i)^T \begin{bmatrix} 0 \\ 0 \\ -m_2 g \end{bmatrix}^i \tag{11}$$

Modifying the moment of inertial and accounting for the added motor thrusts, the complete set of equations is obtained describing the rotational dynamics of the coupled system as follows:

$$M_1 = \begin{bmatrix} l_1(T_2 - T_4) + l_2(T_6 - T_8) \\ l_1(T_3 - T_1) + l_2(T_7 - T_5) \\ \tau_2 + \tau_4 + \tau_6 + \tau_5 - \tau_1 - \tau_3 - \tau_5 - \tau_7 \end{bmatrix}^b \tag{12}$$

where $M_1$ is used to denote the applied moment due to differential thrust and $I_1$ and $I_2$ are the moment arms of quadrotors one and two, respectively. Then, with $I_2^b$ being the body frame moment of inertia of the coupled system, the final equation below is obtained. Equation (13) describes the rotational dynamics of the coupled system.

$$I_2^b \begin{bmatrix} \dot{p} \\ \dot{q} \\ \dot{r} \end{bmatrix}^b + \begin{bmatrix} p \\ q \\ r \end{bmatrix}^b \times I_2^b \begin{bmatrix} p \\ q \\ r \end{bmatrix}^b = M_1 + M_2 \tag{13}$$

Modified equations (7) and (13) together with the differential relations for the Euler angles creates another set of twelve non-linear, coupled, state equations that can be solved with appropriate initial conditions.

C. Coupling Mechanism

Figure 3A:
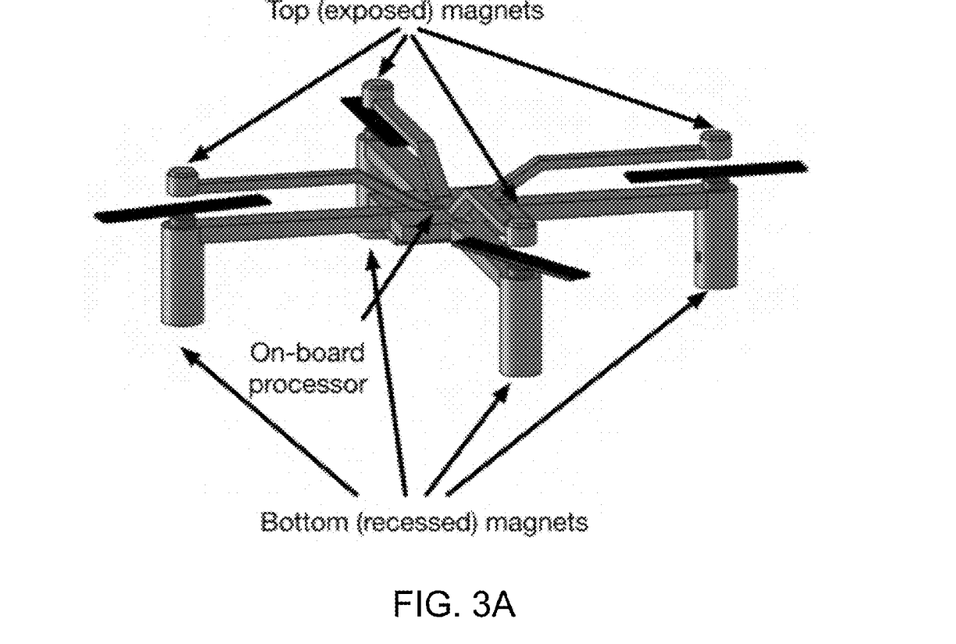
FIGS. 3A and 3B are illustrations showing a quadrotor and a coupling mechanism between two quadrotors.
Figure 3B:
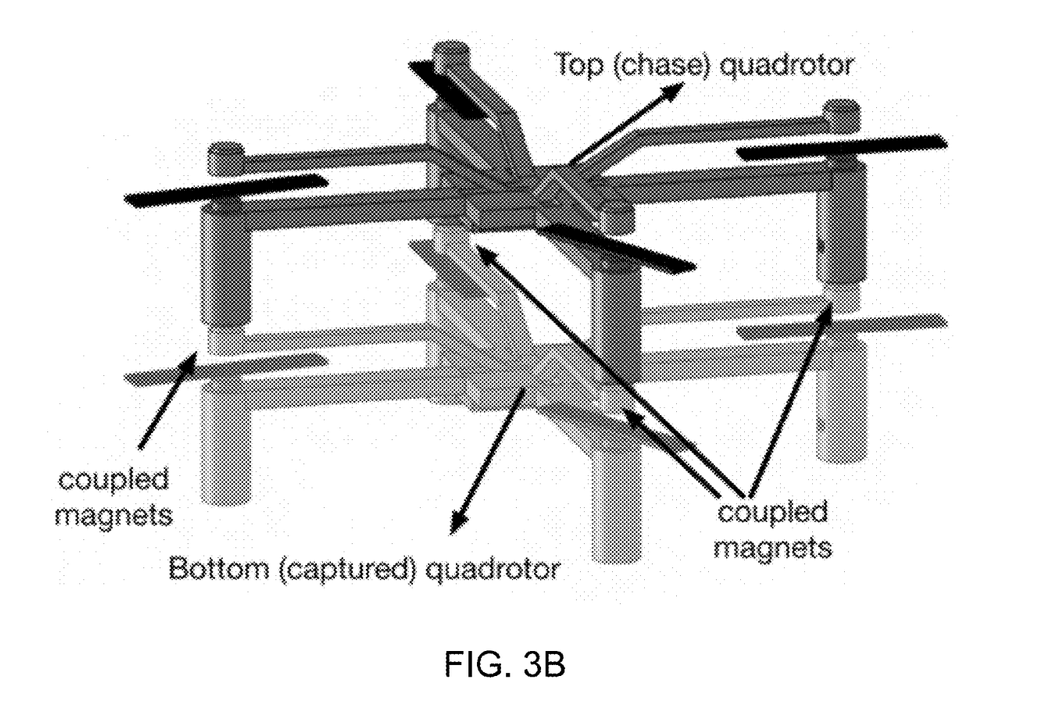

The coupled dynamics of the system have now been established. The operation of the connection mechanism and how it may be implemented physically will be discussed including some of the implications it may have on the system dynamics. In some embodiments, the current quadrotor design may include neodymium permanent disk magnets to be used to secure the quadrotors in a coupled configuration, as shown in FIG. 3. The magnets may be 8 millimeters in diameter by 4 millimeters thick in size and may have a max pull force of approximately 20 Newtons (model number M8X4MMDI). In some embodiments, each quadrotor is outfitted with eight such magnets as depicted in FIG. 3. The bottom magnets may be slightly suppressed as to ensure not only a magnetic coupling, but also a mechanical one utilizing the force of friction to retain the captured vehicle. The force for disturbance modeling assumes that the magnet centers are 4 millimeters apart at steady state (post coupling). It is also assumed that once the connection is made, the maneuvers of the system do not cause the linkage to fail. However, considering the non-linearity of magnetic force, there is little doubt that some disturbance will be exerted on the coupled system at the time of impact due to the use of these magnets.

The complexity of the magnetic force and its dependency on geometry may complicate the issue. Many publications derive mathematical expressions that relate the magnetic force to the detailed geometry of the two permanent magnets considered. This level of detail is beyond the current scope, however, if it is assumed the magnets to be small enough and relatively at rest, the magnets can be modeled as point charges and Coulomb's law can be implemented. This approach may be employed here as the force between two point charges is given by the following equation:

[11]:

$$F_{mag} = \frac{|q_1 q_2|}{4\pi \epsilon_0 \delta^2} \tag{14}$$

In the above expression, $\delta$ represents the distance between the two magnets, $q_1$ and $q_2$ are the electric charge strengths and $E_0$ the permeability of free space. Given the non-linearity of the magnetic force in Equation (14), it is likely that modeling this interaction as linear will not provide for an accurate result. Instead, it is assumed that the upper quadrotor is able to maintain a hover state relative to the lower. This can be validated by considering that an increase in thrust may compensate for the added magnetic force, especially noting that the force on quadrotor one is downward in the $z^b$ direction. This, however, is not the case for the lower quadrotor in that it will not be able resist a force greater than its weight to remain in equilibrium. Therefore, for impact modeling, it is assumed that the lower vehicle non-linearly accelerates toward the upper given that the net force acting on it is that of the magnets. Further, since the force is dependent on the separation distance between the two vehicles, it was decided that, instead of modeling a disturbance force, Newton's conservation of momentum expressed by the equation below is applied:

$$m_1 V_1^i + m_2 V_2^i = (m_1 + m_2) V_3^i \tag{15}$$

Here, $m_1$ and $m_2$ are the masses of quadrotors one and two, $$V_1^i, V_2^i, V_3^i$$

are the inertial velocity vectors of vehicles one, two and the combined (post coupling) configuration, respectively. In this representation, Vi/2 includes not only the inertial velocity of quadrotor two, but also the disturbance velocity applied to the system due to the non-linear magnetic force and resulting acceleration prior to coupling, as discussed below.

The challenge is now to find Vi/2, as it is likely to be changed due to the non-linear acceleration discussed above. Therefore, this velocity term is modeled as follows:

$$V_2^i = v_2^i + v_d^i \tag{16}$$

The disturbance velocity, vi/d, is found through a secondary simulation that finds the velocity of equal mass to the second quadrotor at the time of impact. This result can be further confirmed by employing the work-energy theorem [12], although using this method will only provide a scalar velocity. However, it is known that the increase in velocity must be in the $z^b$ direction, considering this is the direction of the net force acting on the object. For the purposes of calculating this disturbance velocity, a second, temporary, inertial frame is constructed to be aligned in the same orientation as the body frame. Then, expressing this velocity gain in the original (world) inertial frame, it is concluded that:

$$v_d^i = R_b^i v_d^b \quad (17)$$

Having obtained this result, it then becomes possible to solve for the vector quantity $$v\frac{i}{3};$$

and feed the result in as an initial condition into the coupled simulation. This is done within the simulation and accounts for both moving and stationary coupling instances.

D. Controller Methodology—Static Coupling

The control method established in the present disclosure focuses on the use of Proportional-Integral-Derivative (PID) controllers to control the location and velocity of a given quadrotor. In the current simulation, a PD controller is utilized due to the lack of any disturbances that may cause steady state errors. The controller is obtained by considering the translational dynamics and assuming that the angles $\phi$, $\theta$, $\varphi$ remain small. This establishes a linear PD control law that can then be used to set the desired quadrotor attitude by using feedback of position and velocity. The control law is given by:

$$\ddot{r}_{desired} = K_P e_{position} + K_D e_{velocity} \quad (18)$$

Here $K_P$ and $K_D$ are diagonal gain matrices for proportional and derivative terms respectively. Additionally, $e_{position}$ and $e_{velocity}$ are the errors in position and velocity. In most cases, the desired velocity is set to zero (hover). Equation (2) is then solved for the desired attitude of the vehicle, considering that the controller above will output the desired translational acceleration. In the current modeling, the yaw angle is allowed to be changed during flight in order to reduce the coupling sequencing time and allow for a more versatile platform in the case of enemy pursuit.

$$\phi_{desired} = \frac{1}{g}[\ddot{r}_{1,desired}\cos\psi + \ddot{r}_{2,desired}\sin\psi] \quad (19)$$

$$\theta_{desired} = \frac{1}{g}[\ddot{r}_{1,desired}\sin\psi - \ddot{r}_{2,desired}\cos\psi] \quad (20)$$

$$u_1 = m(g + \ddot{r}_{3,desired}) \quad (21)$$

In the equations above, $\varphi$ represents the current yaw angle of the vehicle, $\ddot{r}_{n,desired}$ are the desired linear accelerations in inertial x, y, z space and $\phi_{desired}$, $\theta_{desired}$ are the required roll and pitch angles required to achieve these accelerations, as computed by the PD controller. The $u_i$ input is fed directly into the plant as it controls the acceleration and position along the inertial z-axis (altitude). Note that, using the modeling presented here, the u1 input is the desired force exerted in the $z^b$ direction. Changes in the other desired quantities ($\phi_{desired}$ and $\theta_{desired}$) require a net moment to be applied, and is discussed below. This applied moment must be relative to the current attitude of the vehicle and hence, a second PID control loop is constructed.

$$u_2 = k_{p,\phi}e_\phi + k_{d,\phi}e_p \quad (22)$$

$$u_3 = k_{p,\theta}e_\theta + k_{d,\theta}e_q \quad (23)$$

$$u_4 = k_{p,\psi}e_\psi + k_{d,\psi}e_r \quad (24)$$

Similarly to that discussed above, the $u_2$, $u_3$ and $u_4$ inputs calculated by the PD controller are the required moments along the three body axes in order to obtain, or maintain, the desired yaw, pitch and roll angles. Also, $e_p$, $e_q$, $e_r$ are the errors in roll, pitch and yaw rates, respectively, in the body frame. Considering that this second control loop is also a PD controller, the values of the proportional and derivative gains can be individually tuned to provide the required or desired response characteristics in the angular modes. Once the forces and moments are found from the controllers, they can be related to the angular velocity of each motor. Here it is assumed that the forces and torques of each motor can be modeled as follows [3]:

$$F_n = k_F \omega_n^2 \quad (25)$$

$$Q_n = k_M \omega_n^2 \quad (26)$$

In the representations above, $\omega_n$ is the rotational frequency of motor n, $k_F$ and $k_M$ are the thrust and moment coefficients, and $F_n$, $Q_n$ are the resulting thrust and moments, respectively.

Using this method of modeling, a relation is created between force, moment and rotational frequency. Inverting this matrix allows for the solution of the rotational frequencies, which are then to be relayed to the quadrotor motors.

$$\begin{bmatrix} u_1 \\ u_2 \\ u_3 \\ u_4 \end{bmatrix} = \begin{bmatrix} k_F & k_F & k_F & k_F \\ 0 & k_F l_1 & 0 & -k_F l_1 \\ -k_F l_1 & 0 & k_F l_3 & 0 \\ -k_M & k_M & -k_M & k_M \end{bmatrix} \begin{bmatrix} \omega_1^2 \\ \omega_2^2 \\ \omega_3^2 \\ \omega_4^2 \end{bmatrix} \quad (27)$$

Currently, the assumption is that of identical coupled quadrotors. Therefore, when the coupling occurs, the forces and moments are equally divided among the eight input system that results.

E. Controller Methodology—Interception Coupling

The controller for the interception stage of flight differs somewhat from that for static coupling due to the increased complexity of the problem. In this stage of simulation, one vehicle is commanded to fly at a given velocity that may change at any point in flight, while the second is then to pursue and couple to the original quadrotor. This pursuit mode is completed by modifying the error in the controller from that of absolute to relative, In other words, the controller on board the chasing vehicle is modified so that the error it eliminates is that of relative position and velocity, i.e.:

$$\ddot{r}_{desired} = K_P^{int}\Delta_{pos} + K_D^{int}\Delta_{vel} \quad (2)$$

Here, $\Delta$pos and $\Delta$vel are the relative position and velocity errors between the chase and enemy quadrotor and $$K\frac{int}{P}, K\frac{int}{D}$$

are me gains of the chase vehicle's controller.

In addition, the desired yaw, roll and pitch angles of the first quadrotor are set to match those of the second ensuring a secure and feasible connection. The above controller functions in cases where the enemy vehicle maneuvers as well as those situations where it does not. The details of the simulation results are presented in a later section.

F. Other Modeling Considerations

Additional consideration must be given to the aerodynamics of the coupled quadrotor system. There is little doubt that the lower vehicle will experience some interference due to the presence of the upper, however, an attempt to quantify these potential losses must be made.

There are multiple ways in which this aerodynamic interaction can be approached, however, other methods employed is that of control volume analysis. In this type of analysis, conservation of mass and momentum are applied to a system that is defined around each of the rotors. Results from a theoretical and experimental analysis of coaxial quadrotor rotors shows that the lower rotors will operate at approximately a 20% increase in power when producing the same thrust as that of the upper, which is seeing quiescent flow. The reduction in apparent efficiency will mainly manifest itself in a reduction in flight endurance time, which will be further dependent on the battery used. It should also be noted that the reduction in efficiency is highly dependent on the separation distance of the two vehicles, which is a design parameter of the coupled system. This issue may be further remedied by variable pitch propellers, at the expense of a more complex system. However, for the current analysis, a 20% increase in power of the lower quadrotor will be considered acceptable.

III. Results

Figure 4:
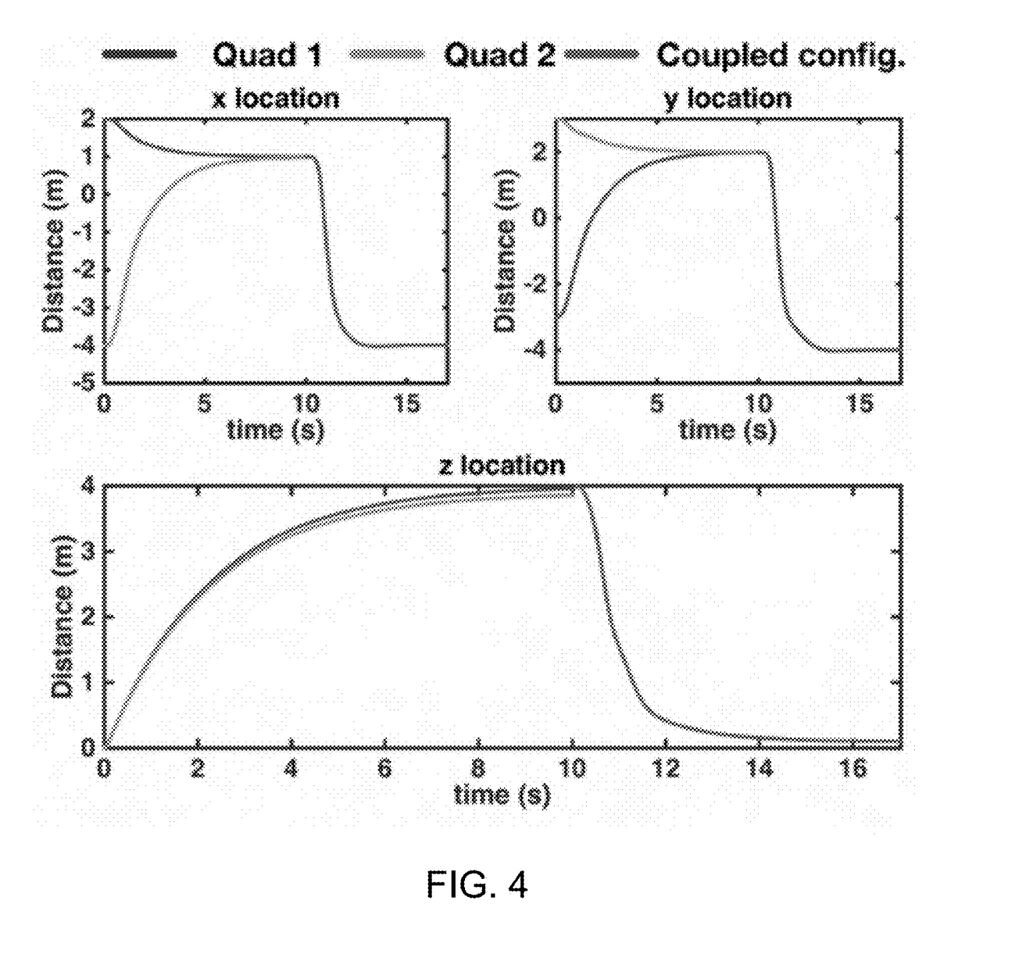
FIG. 4 are diagrams illustrating simulation results showing the inertial x, y, and z position for the static coupling scenario.

A preliminary simulation was conducted to show static coupling. This portion assumes that each quadrotor has a controller identical to that presented in eq. (18)-(24). Using this controller, each vehicle is started from an arbitrary position in inertial space then commanded to fly to the same location and maintain hover. The first (upper) quadrotor's position is adjusted to account for the linkage distance in order to simulate a more accurate depiction of the event. The individual quadrotor gains are tuned as to provide a satisfactory rise time and for the system to behave approximately critically damped as shown in FIG. 4. For the first stage of flight, the controllers are set to be identical. However another iteration process to tune the controller gains was done for the coupled system, as the altered dynamics will change the open loop poles of the plant. The gains for the coupled systems are set dependent on the application and anticipated maneuvers. In the case shown here, the system gain values are set to provide another critically damped response, considering that zero altitude corresponds to ground level and any overshoot in this direction would likely prove to be catastrophic. This third controller assumes control over the entire system at the time of coupling. From this point on desired locations and velocities are set as those of the upper quadrotor. In the simulation results shown in FIG. 4, the coupled system is set to return the lower quadrotor safely to the ground as to emulate an air rescue of a vehicle with low battery. Considering that it is the position of the upper quadrotor that being controlled, the altitude of the final system is set to account for the linkage offset in order to ensure a safe landing for the lower vehicle. It is for this reason that the coupled system results shown in FIG. 4 never reaches an altitude of zero.

Figure 5:
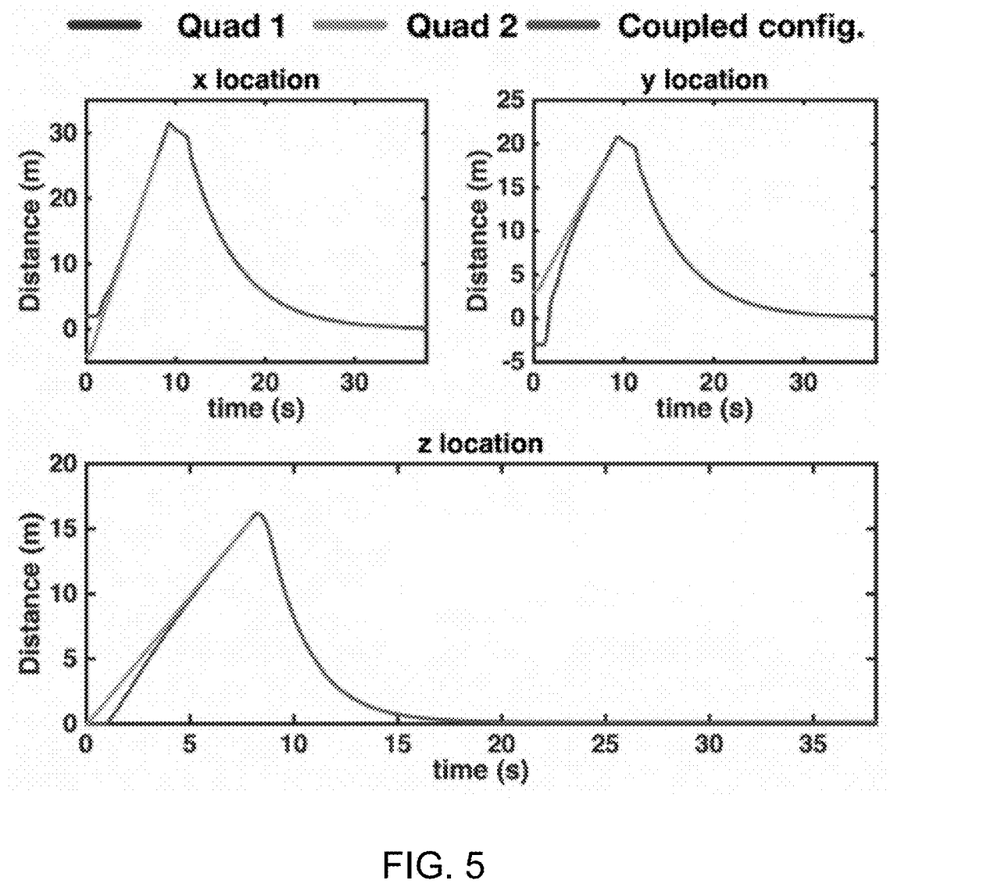
FIG. 5 are diagrams illustrating simulation results showing the inertial x, y, and z position for non-static, no target maneuvering coupling scenario.
Figure 6:
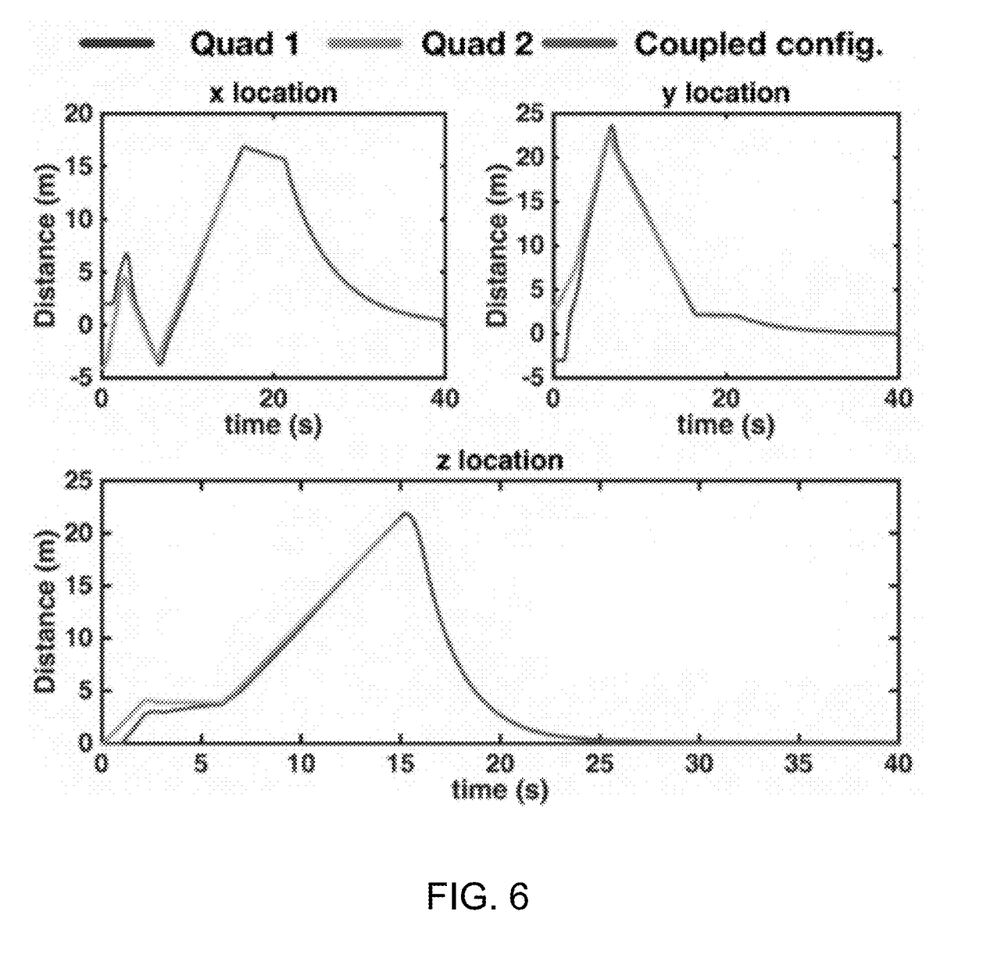
FIG. 6 are diagrams illustrating simulation results showing inertial x, y, and z position for the non-static, target maneuvering coupling scenario.

Similar simulation results are shown in FIGS. 5 and 6 but for the non-static coupling scenario simulations. The results presented in FIG. 5 are for the case of quadrotor pursuit with no enemy maneuvering. In both non-static coupling scenarios, the second quadrotor's controller is nearly identical to that presented in eq. (18)-(24), as discussed above. The chase vehicle has a controller onboard that works to minimize the relative error between the two objects, with the mathematical expressions given by (28) and (19)-(24). In other words, the desired translational acceleration controller is modified to calculate desired yaw, pitch and roll angles based on the relative position and velocity error between the two quadrotors. The desired roll, pitch and yaw angles are then fed in as inputs into the second control loop that remains in large part the same as previously discussed. In the simulation cases presented in FIGS. 5 and 6, the first quadrotor was given an approximate one second lead from its original position in inertial space. This poses an additional consideration when conducting gain tuning as high error magnitudes are likely to result at the launch of the second (chase) vehicle, making system stability more difficult to maintain. The chase vehicle will constantly adjust its desired position and velocity based on feedback from the location of the second quadrotor as well as appropriately compensate for the linkage offset location to ensure an accurate connection. Once the coupling occurs, the system will again switch to a single joint controller to guide the remainder of the flight.

A. Adaptive Gain Tuning

It was noted that, if relatively aggressive maneuvers were to be desired immediately after the coupling time instance, large errors combined with relatively high gains and altered dynamics may cause an under-damped system. Therefore, for the coupling events shown in FIGS. 5 and 6, the onboard controller has variable gains that change throughout the course of flight. More specifically, the gains of the combined controller are set to be more moderate in the time instances immediately following the coupling event and then changed to more aggressive values once the system has been stabilized.

This gain scheduling, mentioned above, is crucial for the successful coupling of the two vehicles. Additionally, the gains on the pursuit quadrotor were also dynamically changed throughout the flight scenarios. When the chase vehicle launches, its controller will attempt to minimize the relative error between it and the enemy quadrotor as given by equation (28). However, the gain tuning for a stable system can be a relatively difficult task to accomplish considering that large values of A may occur at the time of initiation. Therefore, the initial flight stage gains are set relatively low, in sacrifice of a slower response time. This methodology is also followed for the cases when the enemy vehicle rapidly changes flight directions, in which the chase quadrotor must make appropriate adjustments to its attitude in order to achieve the newly command acceleration and direction while maintaining stability. Once the flight conditions stabilize into a set direction, the controller gains of the pursuing vehicle (Kint/P, Kint/D) are increased in order to facilitate a rapid capture. Once the capture occurs, the joint controller assumes responsibility for the position and velocity of the configuration, and a new desired position and velocity are set. Note that the joint controller, as given by equation (18), also allows for the system to change yaw angle during flight. Similarly, at the time of capture, the gains of the combined controller are set conservatively in order to stably actuate motion towards the set position. As such, derivative control values on position are set to be high as compared to proportional gain values in order to provide adequate dampening to the system. Once motion is initiated towards the intended target, the proportional and derivative gains are increased to provide a faster response time. The increase in gains event can be clearly seen in FIGS. 5 and 6 and was most notably observed in the non-static coupling situations. This is observed by examining the inertial x coordinate response characteristics in FIGS. 5 and 6. Here, the initial coupling event occurs followed by a short period of relatively small change. However, when the gains on the joint controller are increased, an immediate change is noted in the rise time of the response. In the case shown in FIG. 6, this change in gains occurs around the twenty second mark.

There was additional consideration in interpreting the simulation results as to consider controller output saturation. It was also noted that the values of the joint controller gains are highly dependent on the orientation of the vehicles at the time of coupling relative to the desired attitude and position set immediately after the event. For the results shown here, the gain values have been specifically tuned to provide adequate system response characteristics for each flight situation.

Figure 7:
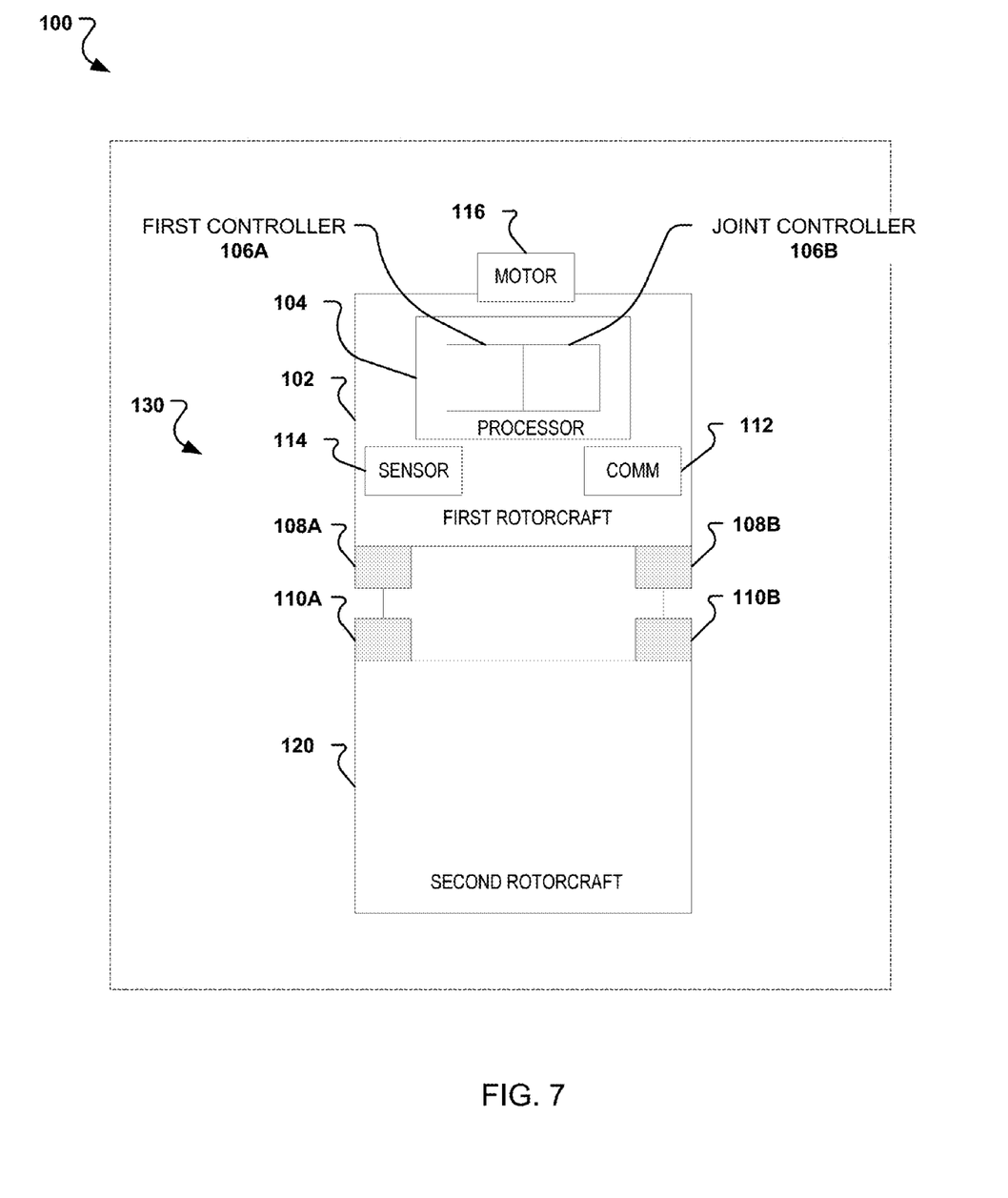
FIG. 7 illustrates a system for coupling and navigating a plurality of rotorcrafts, according to aspects of the present disclosure.
Figure 8:
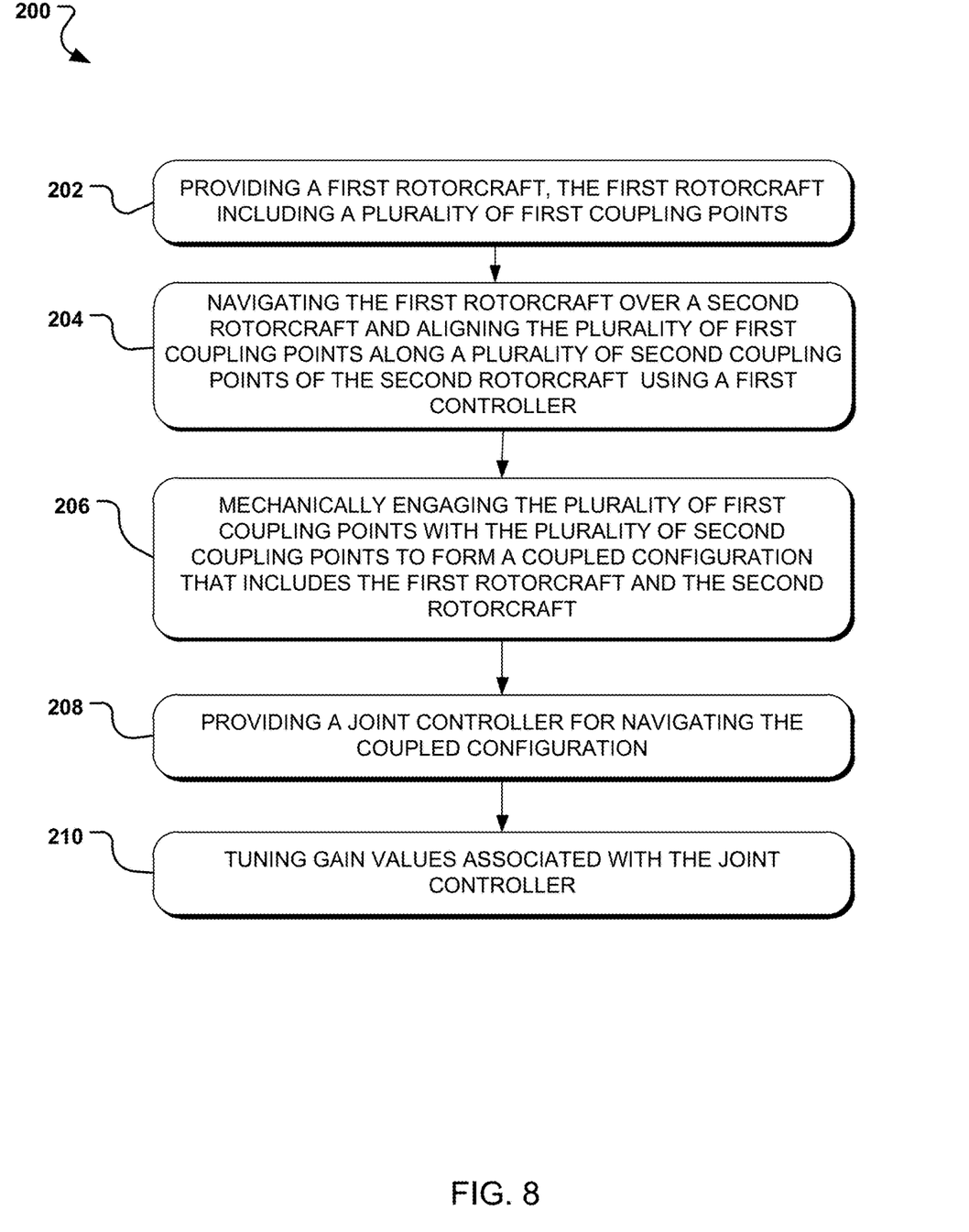
FIG. 8 is an exemplary process flow for coupling and navigating a plurality of rotorcrafts and is related to the system of FIG. 7, according to aspects of the present disclosure.

Referring to FIGS. 7-8, a system 100 and an exemplary process flow 200 are illustrated for further describing aspects of the present disclosure. The system 100 may include a first rotorcraft 102, and a second rotorcraft 120. A rotorcraft as described encompasses the quadrotors described above, such as the quadrotors of FIG. 3. As such, it should be understood that any of the concepts described above directed to quadrotors equally apply to any form of rotorcraft that utilizes one or more rotors, such as vertically oriented propellers for generating lift. In FIG. 7, the first rotorcraft 102 may define the chase, or top quadrotor of FIG. 3B, and the second rotorcraft 120 may define the bottom, or target quadrotor.

The first rotorcraft 102 includes a processor 104, which may implement a plurality of controllers 106 and corresponding control loops (not shown). The processor 104 may be mounted to a portion of the first rotorcraft 102, although the present disclosure is not limited in this regard. As described herein, the controllers 106 may be onboard controllers operative to command a rotational frequency of the motor 116 of the first rotorcraft 102. The controllers 106 may include a first controller 106A for controlling the first rotorcraft 102 in a de-coupled configuration, and a joint controller 106B for controlling the first rotorcraft 102 in a coupled configuration 130 (mechanically coupled with another rotorcraft such as the second rotorcraft 120). As further indicated, the first rotorcraft 102 may include a sensor 114 (including a gyroscope and accelerometer) for determining an orientation, a position and a velocity of the first rotorcraft 102 with the sensor 114 being in operative communication with the plurality of controllers 106. The first rotorcraft 102 may further include a communication (COMM) unit 112, such as a modem, for wireless communication with devices such as a command station, network controller, mobile command device, and the like (not shown). Motor 116, may include multiple motors to drive multiple propeller assemblies (not shown) as in the case where the first rotorcraft 102 is a quadrotor or the like.

As further shown, similar to FIG. 3, the first rotorcraft 102 includes a plurality of first coupling points 108A and 108B, and the second rotorcraft 120 includes a plurality of corresponding second coupling points 110A and 1108. The plurality of first coupling points 108A and 108B may be engaged with the plurality of corresponding second coupling points 110A and 1108 to mechanically couple the first rotorcraft 102 with the second rotorcraft 120. The plurality of first coupling points 108A and 108B and the plurality of corresponding second coupling points 110A and 1108 may collectively define a coupling mechanism, and may include magnets, electro-magnets, ball and socket joints, or the like as described herein.

Referring to block 202 and block 204 of FIG. 8, to assume the coupled configuration 130, the first rotorcraft 102 may be navigated over the second rotorcraft 120 using the first controller 106A. The second rotorcraft 120 may be in a fixed position relative to the first rotorcraft 102, or in motion as described herein. In some embodiments, to position the first rotorcraft 102 over the second rotorcraft 120, the first controller 106A is implemented to construct a first control loop to compute a force for adjusting translational acceleration and positioning of the first rotorcraft 102 along an inertial Z-axis at a predetermined location proximate the second rotorcraft 120. In addition, the first controller 106A may be implemented to construct a second control loop for determining a plurality of moments for adjusting angles associated with yaw, pitch and roll of the first rotorcraft 102 to orient the first rotorcraft 102 in the predetermined position over the second rotorcraft 120. The force and plurality of moments described are utilized to configure an angular velocity of the motor 116 (or motors) associated with the first rotorcraft 102.

Referring to block 206, the plurality of first coupling points 108A and 108B may then be engaged with the plurality of corresponding second coupling points 110A and 1108 to mechanically couple the first rotorcraft 102 with the second rotorcraft 120 and form the coupled configuration 130, or coupled system. This mechanical coupling may be temporary using magnets, which may be desirable where it is intended to de-couple the first rotorcraft 102 from the second rotorcraft 120 for various applications. Using magnets for the coupling points that are recessed as described in FIG. 3, friction may be increased between the first rotorcraft 102 and the second rotorcraft 120 to accommodate a more suitable mechanical connection.

Referring to block 208, just before, during, and/or subsequent to the formation of the coupled configuration 130, the joint controller 106B may assume command of the motor 116 driving the first rotorcraft 102 to adjust a rotational frequency of the same. In some embodiments, the joint controller 106B includes a proportional integral derivative controller as described herein to control a location and a velocity of the first rotorcraft 102, although the present disclosure is not limited in this regard. The joint controller 106B guides the coupled first rotorcraft 102 and the second rotorcraft 120 for the remainder of the flight.

Referring to block 210, the gain values associated with the joint controller 106B may be tuned, scheduled, or configured, just before, during, and/or subsequent to the formation of the coupled configuration 130, to adapt and to accommodate the different dynamics pre and post-coupling of the first rotorcraft 102 with the second rotorcraft 120. For example, upon assuming the coupled configuration 130, the joint controller 106B may set a new desired position and velocity. Gains of the joint controller 106B may be set conservatively low at the time of capture (of the second rotorcraft 120 by the first rotorcraft 102) or assumption of the coupled configuration 130, in order to stably actuate motion towards the set position. More specifically, derivative control values on position may be set high as compared to proportional gain values in order to provide adequate dampening to the coupled configuration 130 and the system 100. Once motion is initiated of the first rotorcraft 102 and the second rotorcraft 120 towards an intended target or destination, the proportional gain values and derivative control values may be increased to provide a faster response time. Numerous other methods for tuning the gains of the joint controller 106B are described herein.

Additional embodiments are contemplated. For example, it should be appreciated that the different rotorcraft may vary in size such that they need not be identical. Further, the above dynamics and methods may be used to engage a plurality of chase rotorcraft to a target rotor craft to form the described coupled configuration. In this embodiment, forces for moving the rotorcraft of the coupled configuration may be shared or distributed.

CONCLUSION

The analysis and simulation of a coupled quadrotor system opens new frontiers and the possibility of quadrotor rescue or enemy quadrotor chase and capture. This disclosure presents the modeling and dynamics of a coupled quadrotor system as well as a simulation displaying various flight situations. Simulation results show the feasibility of this concept and the applicability of PID control with adaptive gain tuning to be used in a variety of flight situations. Gain tuning was performed to account for system configuration and orientations to ensure stability and satisfactory response characteristics. Experiments testing the controller in the actual platform are ongoing. Future work will be directed towards the consideration and design of a new coupling mechanism to possibly implement the use of electromagnets or a ball and socket joint in order enable the vehicles to decouple during flight.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for controlling a plurality of rotorcrafts, comprising:
   a first controller implemented by a processor;
   a first rotorcraft in operative communication with the first controller, the first rotorcraft including a plurality of first coupling points;
   a second rotorcraft, the second rotorcraft comprising a plurality of second coupling points, the second coupling points configured to temporarily engage with the first coupling points; and
   a joint controller implemented by the processor for navigating the first rotorcraft and the second rotorcraft;
   wherein the first rotorcraft is operable to assume a coupled configuration with the second rotorcraft by utilizing the first controller to modify an altitude and coordinates associated with yaw, pitch and roll angles of the first quadrotor relative to the second rotorcraft and adjoin the first coupling points with the second coupling points; and
   wherein in the coupled configuration, gains of the joint controller are scheduled such that the gains are set to a first setting immediately following the assumption of the coupled configuration and the gains are subsequently modified to a second setting.

2. The system of claim 1, wherein the gains of the second setting are greater than the gains of the first setting, and changes to the gains define a gain scheduling to accommodate stabilization of the first rotorcraft and the second rotorcraft while assuming the coupled configuration.

3. The system of claim 1, wherein the processor is mounted to a portion of the first rotorcraft such that the first controller defines an onboard controller.

4. The system of claim 1, wherein the first controller is implemented to:
   construct a first control loop to compute a force for adjusting translational acceleration and positioning of the first rotorcraft along an inertial Z-axis at a predetermined location proximate the second rotorcraft, and
   construct a second control loop for determining a plurality of moments for adjusting angles associated with yaw, pitch and roll of the first rotorcraft to orient the first rotorcraft in a predetermined position over the second rotorcraft; and
   wherein the force and plurality of moments are utilized to configure an angular velocity of each of a plurality of motors associated with the first rotorcraft.

5. The system of claim 1, wherein upon assuming the coupled configuration between the first rotorcraft and the second rotorcraft, the joint controller assumes responsibility for a position and a velocity of the first rotorcraft and the second rotorcraft in the coupled configuration.

6. The system of claim 5, wherein derivative control values on position are set to a first value greater than a set of proportional gain values in order to provide adequate dampening to the system.

7. The system of claim 6, wherein upon motion of the first rotorcraft and the second rotorcraft in the coupled configuration being initiated towards an intended target, the proportional gain values and derivative control values are increased to provide a faster response time.

8. The system of claim 1, wherein the plurality of first coupling points and the plurality of second coupling points comprise magnets.

9. The system of claim 1, wherein the plurality of first coupling points and the plurality of second coupling points comprise a plurality of respective ball and socket joints.

* * * * *